United States Patent [19]
Rub et al.

[11] Patent Number: 5,278,703
[45] Date of Patent: Jan. 11, 1994

[54] EMBEDDED SERVO BANDED FORMAT FOR MAGNEETIC DISKS FOR USE WITH A DATA PROCESSING SYSTEM

[75] Inventors: Bernardo Rub, Shrewsbury; Robert Frame, Westboro; John E. DeRoo, Marlborough; Samuel B. Skraly, Westboro; Anne Solli, Framingham, all of Mass.

[73] Assignee: Digital Equipment Corp., Maynard, Mass.

[21] Appl. No.: 719,885

[22] Filed: Jun. 21, 1991

[51] Int. Cl.$^5$ .................................... G11B 5/09
[52] U.S. Cl. ........................ 360/51; 360/48; 360/40; 360/135; 369/32
[58] Field of Search ............... 360/51, 40, 78.14, 135, 360/48, 49, 73.03, 77.08, 77.02, 77.07; 369/32, 59, 50, 111, 275.3

[56] References Cited

U.S. PATENT DOCUMENTS

| | | | |
|---|---|---|---|
| 4,016,603 | 4/1977 | Ottesen | 360/135 |
| 4,198,677 | 4/1980 | Ashinuma et al. | 369/32 |
| 4,714,967 | 12/1987 | Bizjak | 360/48 |
| 4,858,034 | 8/1989 | Hassel et al. | 360/51 |
| 5,121,280 | 6/1992 | King | 360/135 |

FOREIGN PATENT DOCUMENTS

| | | |
|---|---|---|
| 0459726A2 | 5/1991 | European Pat. Off. . |
| 0461912A2 | 6/1991 | European Pat. Off. . |
| 9101554 | 7/1990 | PCT Int'l Appl. . |

*Primary Examiner*—Robert J. Pascal
*Assistant Examiner*—Ali Neyzari
*Attorney, Agent, or Firm*—Cesari and McKenna

[57] ABSTRACT

A data processing system records information on magnetic disks in a format in which sector headers, which include embedded servo information, are radially aligned and recorded at a single frequency and data are recorded at various band-related frequencies. The system records sector headers at a frequency which is optimal for the recording of address information in the shortest sector and records the data at frequencies which are optimal for the recording of information in the disk space allocated to the data portion of the various lengths of sectors. The system synchronizes to the headers, using conventional embedded servo synchronization methods, and produces header timing signals. It can then use the same header timing signals to locate and interpret the headers on different tracks, since the header frequency and the location of the headers are the same in every track. The system may record the data portions of the sectors at frequencies which are related to the header frequency by ratios of small integers. The system then uses, in synchronizing to the disk, a phase locked loop which includes a voltage controlled oscillator (VCO) that is driven to a reference frequency which is directly related to the header frequency. The system divides-down the frequency of the VCO output signal to produce the timing signals for the header. Also, it uses a version of the output signal of the VCO, which is divided-down by a band-related value, as a timing signal for the data.

15 Claims, 7 Drawing Sheets

EMBEDDED SERVO BANDED FORMAT FOR MAGNEETIC DISKS FOR USE WITH A DATA PROCESSING SYSTEM

FIELD OF INVENTION

The invention relates to banded formatting of magnetic disks with embedded-servo information, and to a system for use with the disks.

BACKGROUND OF THE INVENTION

Digital data processing systems typically include data storage devices, for example, multi-platter disk drives. Data are recorded on the disks in concentric tracks. The tracks are divided into sectors, and each sector is further divided into a header section and a data section. Data are recorded in (written) or retrieved from (read) the data portions of the sectors while address information, that is, disk surface number, track number and sector number, is stored in the header sections.

Data are read from or written to the disks using read/write heads. Each head is associated with a particular disk surface or portion of a disk surface. As the disks rotate under the heads, data are, for example, read from a particular sector when the associated head is over the data portion of that sector.

To begin a read or write operation the appropriate head is moved to the track containing the desired sector. The system then synchronizes various timers to the disk and precisely positions the head over the center of the track so that it can read the sector addresses rotating under the head, this is commonly referred to as format synchronization or synchronization to the disk. Once the system is synchronized to the disk, it locates the selected sector by reading the sector addresses and then it performs the read or write operation. If the system has used the head in the preceding read or write operation, or if it stays in synchronism with the disk using appropriate timers, for example during idle times, the system need not re-synchronize to the disk. Each time it uses a different head to perform a read or write operation, however, it must synchronize to the disk.

Using prior technology, most data processing systems record information for synchronization either on an extra servo surface or directly on the data surfaces. Such systems are referred to, respectively, as dedicated servo and embedded servo systems. Dedicated servo systems devote an entire disk surface to synchronization information, while embedded-servo systems devote a relatively small portion of each sector to synchronization information. Thus an embedded-only servo system typically records more data on a given number of disks than does a dedicated servo system.

An embedded-servo system must find the synchronization information before it can start synchronizing, and then it must fully synchronize to the disk in the time it takes the located synchronization information to rotate under the head. Otherwise, the system must wait for another sector containing embedded servo information to rotate under the head before it can complete its synchronization.

The speed with which the system can accurately synchronize to the disk affects the speed with which the system can transfer data to or from the drive. Accordingly, a system must balance the amount of disk space given to synchronization information against the amount of time it takes the system to synchronize to the disk.

A known embedded servo system records sector headers at radially aligned disk locations to enable the system to identify and interpret the header information quickly, even if the head is positioned slightly off of the center of a track. Once any header is located, the system can begin to synchronize to the disk using the synchronization information in the header. If the head can not completely synchronize to the recorded information in the time it takes the header to rotate under the head, the system waits a predetermined time for the next header and completes the synchronization process.

Sectors vary in physical length according to their locations along the radius of the disk. Thus, given the same angular extent for all the sectors, a sector located near the center of the disk is relatively short while a sector located at the outer edge of the disk is relatively long. The time it takes any sector to rotate under the head is a constant, however, because the disk rotates at a constant speed. The sectors thus each contain the same amount of data, regardless of their radial positions, assuming they are recorded at the same frequency.

A data signal is recorded on a disk as a series of magnetic flux reversals. The amount of data which can be recorded in a sector depends on how close together the flux reversals can be spaced without interfering with signal interpretation. The system interprets a flux reversal in a particular location in a sector as, for example, a binary ONE. It interprets the absence of a flux reversal in that particular location as a binary ZERO. If the flux reversals are so close together that the system can not determine if a flux reversal is or is not present at the particular location, the system can not accurately interpret the data. The amount of data recorded in any sector of a disk recorded at a single frequency is thus limited by the amount of data, or the density of the signal, which can be recorded in the shortest sector. The amount of data recorded in the shortest sector is commonly referred to as a "data block," and each sector, regardless of length, contains a single data block.

Several mechanisms have been developed to record more information on a disk. One such mechanism involves recording different portions of a disk at different densities, or signal frequencies. This is commonly referred to as "banding," with portions of the disk recorded at the same frequency being in the same "band." Known banded systems record information in the sectors closer to the outer edge of the disk, that is, the physically longer sectors, at a higher frequency than they record information in the sectors located closer to the center of the disk. This enables the system to record more than one data block in each of the longer sectors, and thus, more data on a given disk.

When information is recorded on a disk at different frequencies, one of the problems which must be solved is how to synchronize the system at the various frequencies. Each time a head is switched between bands, the system must resynchronize to the appropriate frequency before it can interpret the header addresses and find the desired sector.

Known banded systems synchronize to the various bands using a dedicated servo surface. However, as discussed, such dedicated servo systems sacrifice an entire disk surface for the synchronization information.

SUMMARY

The invention is a data processing system in which the format of the magnetic disks is such that the sector headers, which include embedded servo information, are radially aligned and recorded at a single frequency and the data are recorded at various band-related frequencies. More specifically, the system records the headers at a particular frequency which is optimal for the recording of address information in the shortest sector and records the data at frequencies which are optimal for the recording of information in the disk space allocated to the data portion of the various lengths of sectors. The system synchronizes to the headers using conventional embedded servo synchronization methods, and produces header timing signals. When the system moves the head to a track in a different band, it can use the same header timing signals to locate and interpret the headers, since the header frequency and the location of the headers are the same in every track.

Each sector contains one or more block segments. The band closest to the center of the disk is recorded at a frequency which records the highest readable density of data signal in the shortest length sector. This band may, for example, be recorded at a density of 1 full-block segment per sector. A next band may, for example, be recorded a a frequency which records a full-block segment and an additional half-block segment per sector. A track in this band has a first sector which begins with a full-block segment and ends with a half-block segment, a next sector which begins with the second half of the previous block and ends with a full block, and so forth.

When the system performs a read or write operation it moves the head to the appropriate track and, if necessary, establishes format synchronization timing signals by synchronizing to a header in that track. The system then reads the sector addresses until it reaches the sector which contains the desired segment. The system starts, at a predetermined time after the start of the header, a timer which is associated with the length of time it takes the start of the appropriate segment to rotate under the head. When the timer expires, the head is over the segment, and the system can then perform a read or write operation. The synchronization of the system to the disk and the time between headers is independent of the frequency of the data. Thus once the system is synchronized to the disk it can find the start of any segment in any band by starting an appropriate timer during an associated header.

In one embodiment of the invention, the data portions of the sectors are recorded at frequencies which are related to the header frequency by ratios of small integers. The system uses, in synchronizing to the disk, a phase locked loop which includes a voltage controlled oscillator (VCO) that is driven to a reference frequency which is directly related to the header frequency. The system then divides-down the frequency of the VCO output signal to produce the timing signals for the header. Since the data portions of the sectors are recorded at frequencies which are related to the header frequency by a small integer ratio, a version of the output signal of the VCO, which is divided-down by a band-related value, can be used as a timing signal for the data.

BRIEF DESCRIPTION OF THE DRAWINGS

The invention will be pointed out with particularity in the appended claims. The above and other advantages of the invention may be better understood by referring to the following description taken in conjunction with the accompanying drawings, in which:

DETAILED DESCRIPTION

Figure 1:
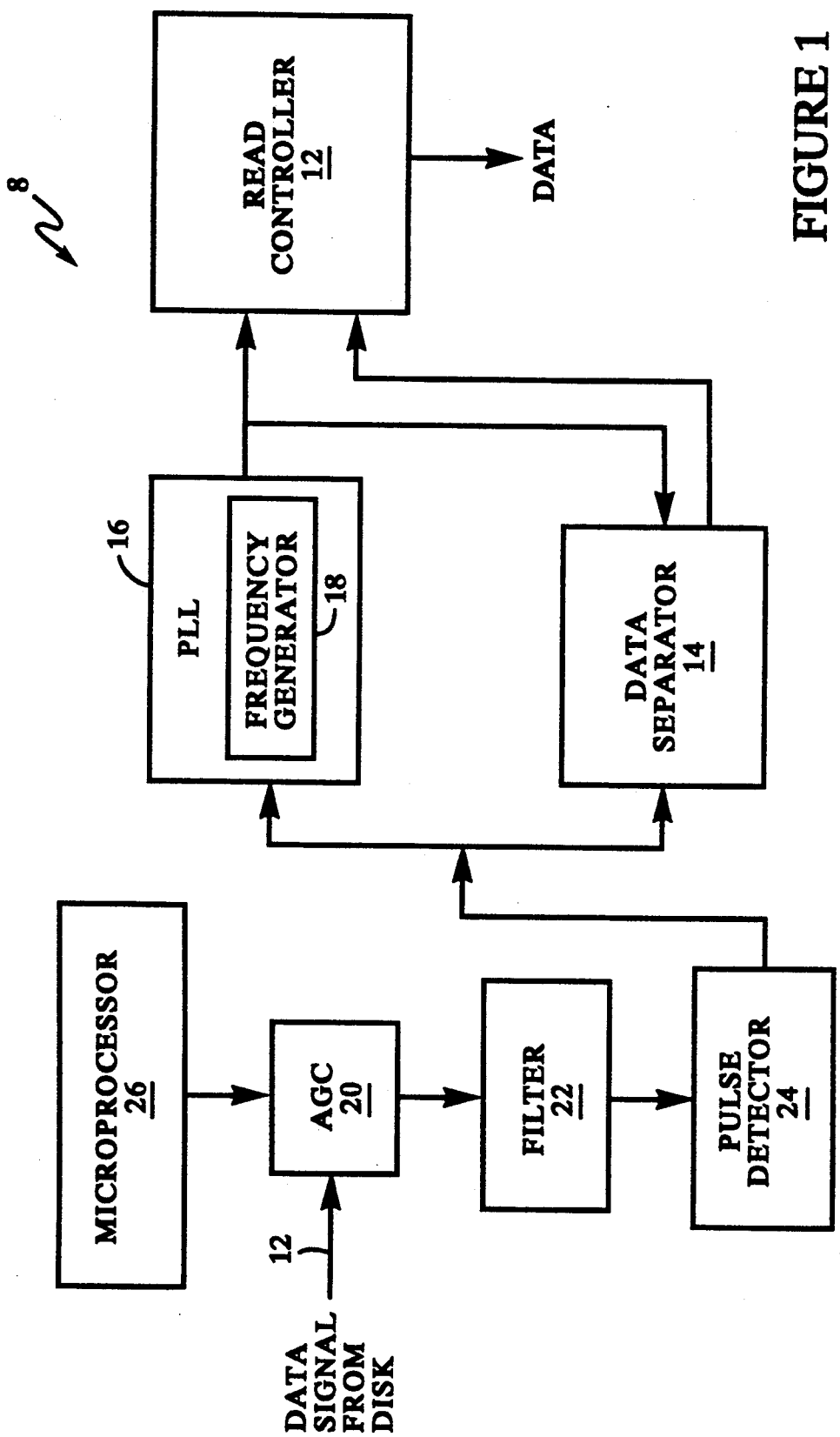
FIG. 1 is a functional block diagram of a system for reading data from a disk in accordance with the invention.

With reference to FIG. 1, a system 8 is shown which may be used for synchronization and reading or writing data to or from magnetic disks (not shown) which are recorded in a banded embedded-servo format, as discussed in more detail with references to FIGS. 2–4 below. A data signal is, for example, read from a disk by read/write heads (not shown) and sent over line 12 to a read channel consisting of an automatic gain control (AGC) 20, a filter 22 and a pulse detector 24, which together filter the data signal to remove noise and amplify and shape data signal pulses, a data separator 14 which "converts" the signal pulses to data, and a phase locked loop (PLL) 16 which synchronizes the read channel to the frequency of the data.

During a read operation the AGC 20 sets the gain of the data channel such that the system 8 can distinguish data signals from noise. The data signals typically consist of relative positive and negative peaks within a predetermined amplitude range while noise signals typically consist of peaks below that range. Thus the gain of the AGC 20 is set either by feed-back from the signal or a setting from an external source, such as controller 12, to a value which will amplify the data signal enough to "read" it but which will not amplify the noise signal to bring its peaks, which fall below the data signal range, within that range.

The filter 22 filters high frequency noise from the data signal and shapes the data peaks by selectively amplifying the higher frequencies more than the lower frequencies. Pulse detector 24 identifies pulses in the data signal by essentially differentiating the signal and locating zero crossing points.

The PLL 16 sets the timing of signal sampling, that is, the times at which the filtered and shaped data signal from the read/write heads is sampled by the data separator 14. The data separator 14 determines if sampled pulses are data or clock pulses, and the system then turns the samples into digital symbols representing the data written to the disk. The digital symbols are thereafter demodulated to binary data bits in a demodulator (not shown). The drive also contains a write channel (not shown) for writing data to the disk.

When data are to be read or written to a disk the system 8, using a controller 12 and a microprocessor 26, selects the head (i.e., the disk surface) associated with the sector involved in the operation and moves the head to the track containing the sector. If the selected head is not the head used in the preceding read or write operation on this disk surface, that is, if a head switch occurs, the timer and the clocks associated with the controller state machine operation must be re-synchronized to the header information recorded on the disk.

The system begins the synchronization process by first finding the beginning of a sector and using the sector header signals to set both the gain of the AGC 20 and the phase of the PLL 16 to values appropriate for the system 8 to read and interpret the header information. The system locates sector to be read or written by reading the addresses recorded in consecutive sectors on the track. Once the appropriate sector is found, the system performs the read or write operation in the data section of that sector, as described in more detail below with reference to FIGS. 6–7. The operations of the PLL 16, which includes frequency generator 18 are described in more detail below with reference to FIG. 7.

Figure 2:
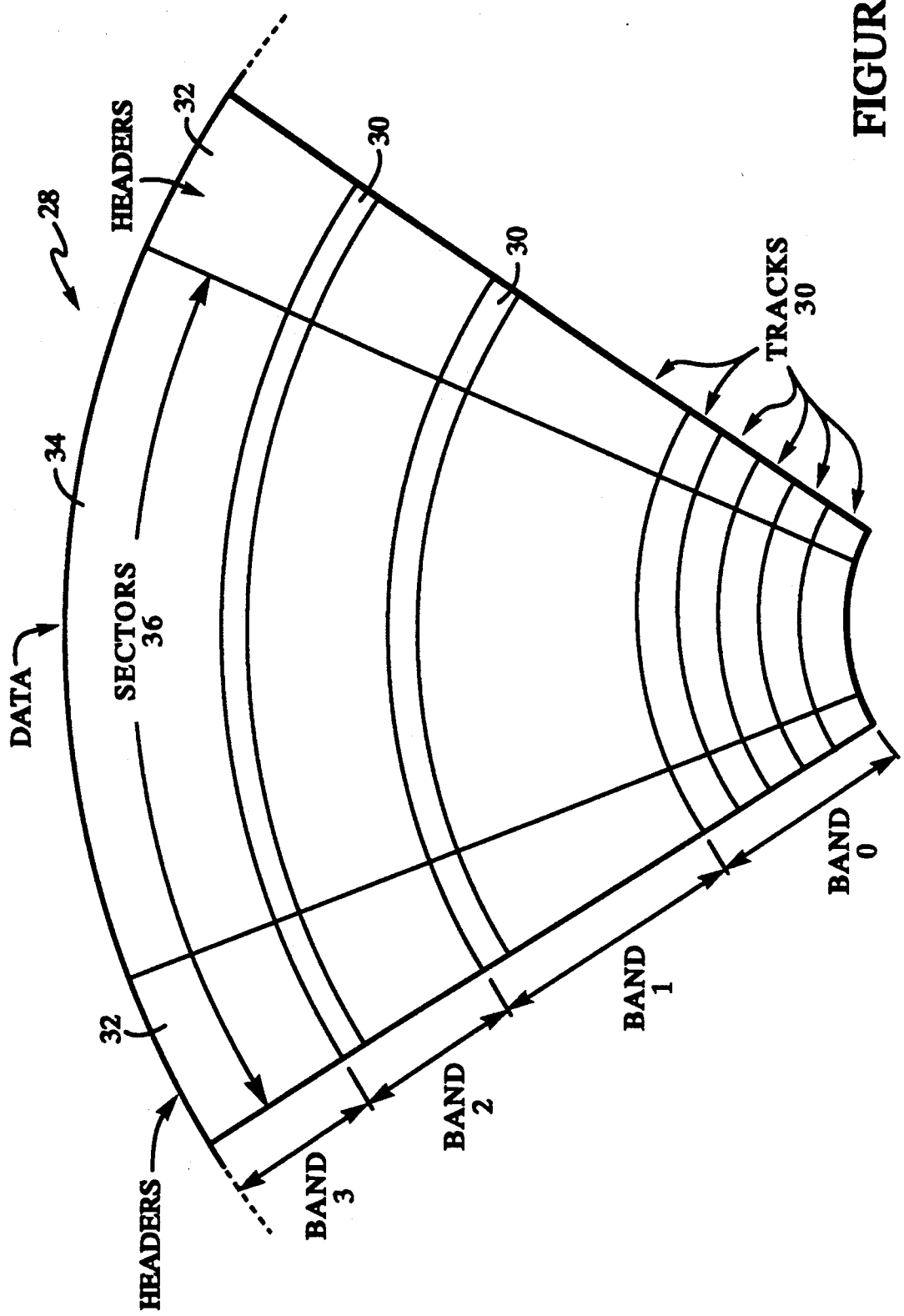
FIG. 2 illustrates the format of a disk recorded in a banded format for use with the system of FIG. 1.

In FIG. 2 a section of a disk 28 is shown recorded in a banded format. The disk 28 is recorded in bands 0-3. Each band contains one or more tracks 30, and each track 30 consists of a number of consecutive sectors 36. The sectors include headers 32 and data sections 34. The headers 32 of corresponding sectors in each track 30 are radially aligned. Accordingly, regardless of the track 30 in which a read or write operation is to take place, as soon as a header is located, the system can precisely time the arrival of each of the succeeding headers 32 at the read/write head.

The headers 32 are all recorded in a single frequency, which is the frequency associated with the optimal signal density for the recording of sector address information in the disk space allocated to the headers. The data portions 34, however, are recorded in frequencies which vary by band since the disk space, i.e., the length of track, allocated to the data portion of a sector varies by radial location. The longer sectors can accommodate more data than can the shorter sectors, and thus they need not be recorded at a frequency associated with the signal density appropriate for the shorter sectors. Accordingly, the data portions 34 of the sectors 36 in band 3 are recorded at a higher frequency than the data portions 34 of the sectors 36 in any of the bands 0-2. The data portions 34 of the sectors 36 in band 2 are recorded at a higher frequency than those in band 1, and so forth. The data portions of the sectors in band 0, which are the shortest sectors on the disk, contain one full block of data.

Figure 3:
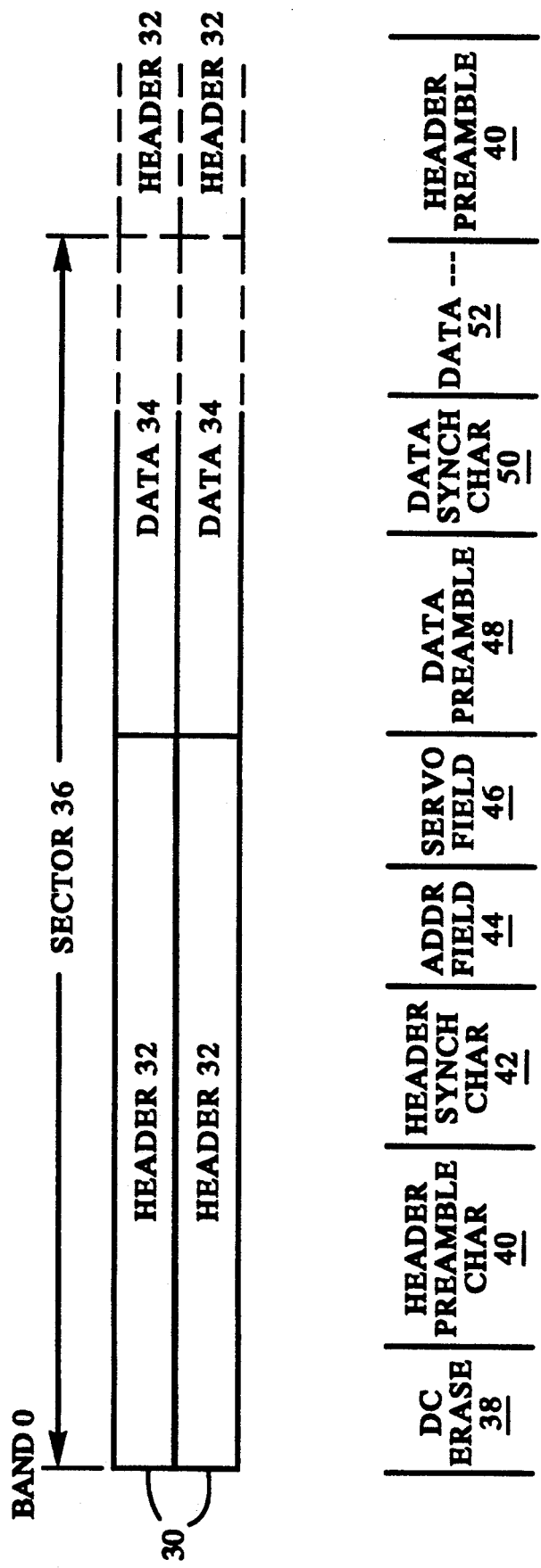
FIG. 3 illustrates in more detail the format of the sectors shown in FIG. 2.

In FIG. 3 two sectors 36 in contiguous tracks 30 of band 0 are shown in more detail. The sectors 36 include headers 32 which are radially aligned, and data sections 34. Each data section 34 is followed immediately by the header section 32 of the next sector. The headers 32, which are a combination of what are commonly referred to as servo headers and data or sector headers, include information required for synchronizing the system to the disk and address information required for determining the exact location of the head, that is, for determining the sector over which the head is then passing.

The headers begin with a DC erase field 38, which is a transitionless segment that the system uses to locate a header whenever the system loses synchronization with the disk. The system thus looks for a DC erase field 38 to find a first header. The system then synchronizes both to the disk and the information in the header using the next two sections of the header, namely, a preamble character 40, which is a pattern of ONES and ZEROS used to set the gain of AGC 20 and to lock the phase of the PLL 16 (FIG. 1) to the bit frequency and phase of the header 32, and a synchronization character 42, which is another pattern of ONES and ZEROS which allows the system to determine the start of bit, byte and word boundaries required for interpretation of the sector addresses. An address field 44 follows the synchronization character 42. The address field 44 contains at least one copy of the sector address and preferably multiple copies of the address. Following the address field 44 is a servo field 46 which contains signals which enable the system to center the head on the track.

The combination in the header of the preamble character the synchronization character and the address field enables the system to synchronize to the disk and at the same time determine the exact location of the head, using only the information in the header. Without such a combination of synchronization and address information in the single frequency headers, the system would have to synchronize to and interpret the data portion of the sector in order to determine the exact location of the head. Further, additional synchronization information would have to be included in the sectors to enable the system to synchronize to the sector addresses, that is, to the data header, and then again to the sector data.

The data portions 34 of sectors 36 each begin with a data preamble character 48 and a data synchronization character 50. The data preamble character 48 is typically the same pattern as the header preamble character 40. A data field 52 follows the synchronization character. The data field in band 0 contains a full block of data symbols and associated error correction and error detection redundancy symbols.

The headers 32 of all the sectors 36 on the disk consist of the DC erase field 38, the preamble and synchronization characters 40-42, and the address and servo fields 44-46 described above. The contents of the data sections 34 of the sectors vary based on the band in which the data are recorded, that is, based on the recording frequency associated with the band. Each data section 34, however, begins with a data preamble character 48 and a data synchronization character 50, although each character is recorded at the appropriate band-based frequency.

Figure 4:
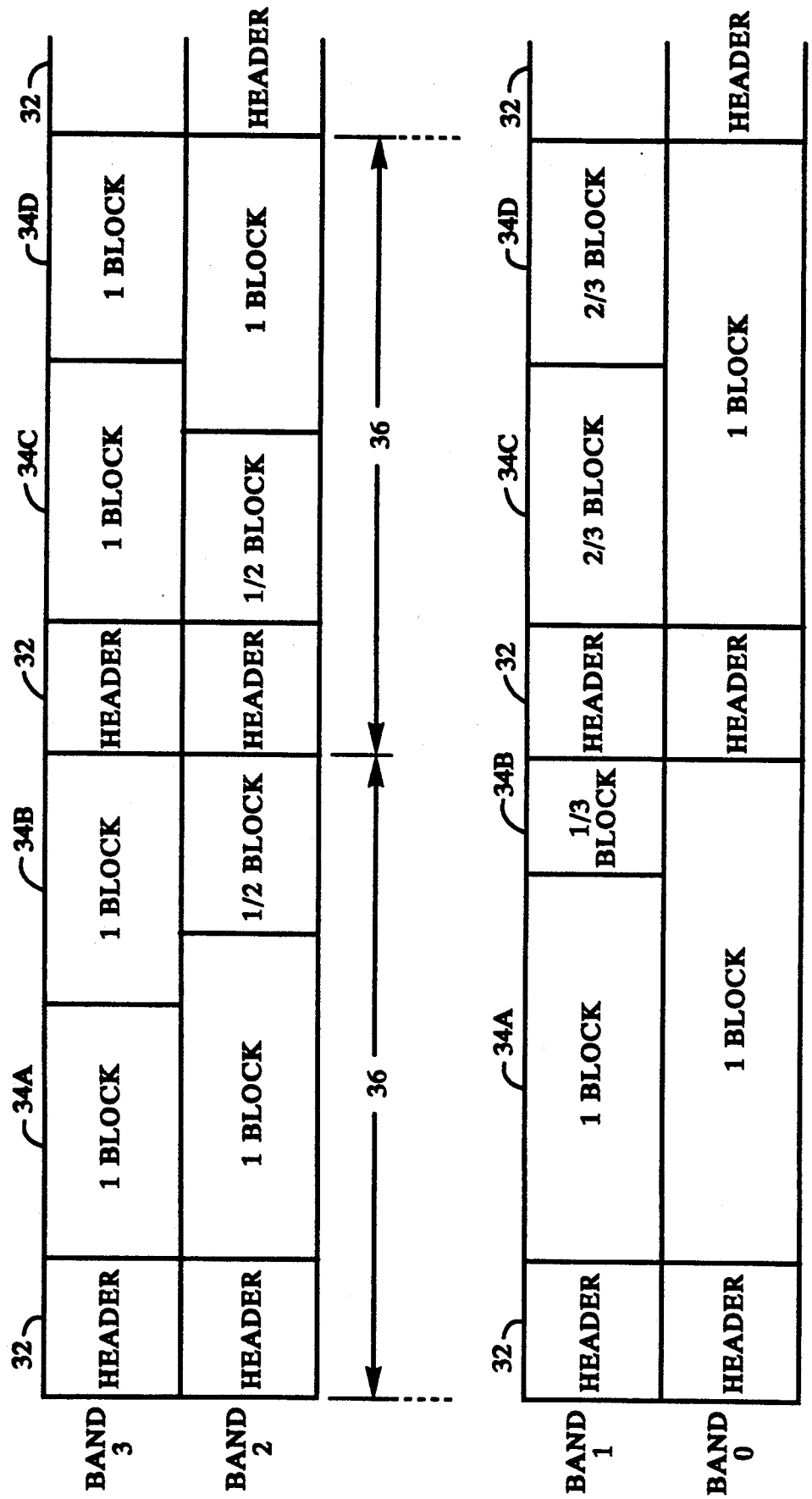
FIG. 4 illustrates in more detail the format of bands shown in FIG. 2.

FIG. 4 shows the sectors 36 for bands 3-0. As described above, the headers in every band are recorded at the same frequency, and thus, they are exactly the same as those shown in FIG. 3. The data portions of the sectors are recorded at frequencies which vary by band, based on the length of the sectors in the various bands. In an illustrative embodiment of the invention, the data sections 34 of the sectors 36 in bands 3-0 are recorded, respectively, at 2-times, 1.5-times, 1.33-times and 1-times the frequency of the headers. Thus varying amounts of data may be recorded between the radially aligned headers.

Figure 5A:
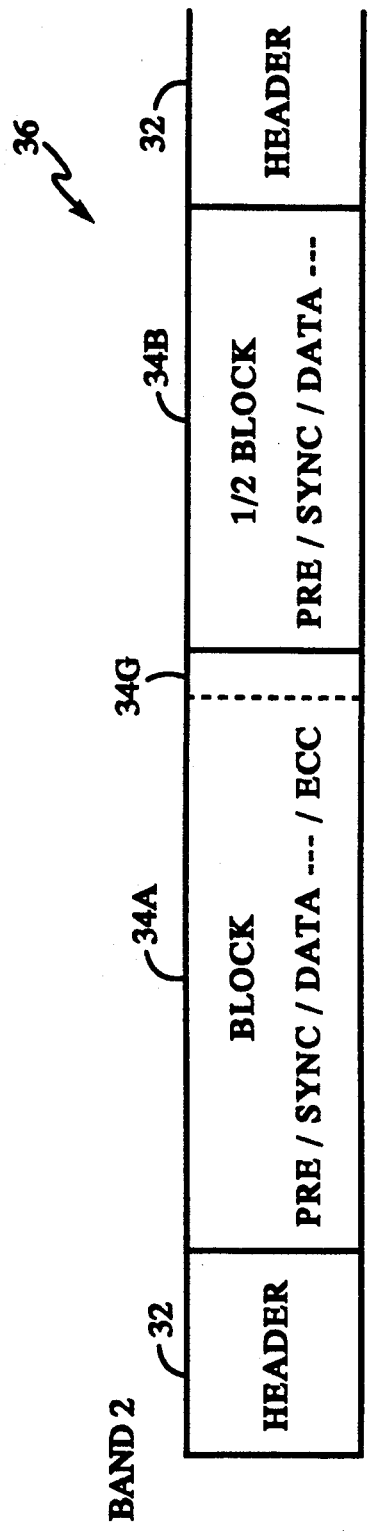
FIGS. 5A and 5B illustrate in more detail the format of sectors in one of the bands shown in FIG. 4.

The sectors 36 in bands 3-1 each contain two data block segments 34A and B or 34C and D. Some segments, such as 34A of band 2 are full blocks, and some segments, such as segment 34B of band 2, are partial blocks. Each of the segments 34A-D begins with a data preamble character 48 and a data synchronization character 5 (FIG. 3) recorded at the appropriate band-based frequency and ends with either data symbols or redundancy symbols. If a sector includes a segment which is a first portion of a data block, the next sector includes a segment which contains the rest of the data block. The signal densities, i.e. frequencies, of each band are selected such that each track contains a number of segments which form an associated number of full data blocks. FIGS. 5A and B illustrate in more detail the format of consecutive sectors 36 in band 2. A sector may include a slight gap 34G between segments as a result of variations in spindle speed, as discussed in more detail below with reference to FIG. 6.

Referring again to FIG. 4, within any band corresponding segments 34 begin at the same position in the sectors 36 containing them. Thus these various segments rotate under a read/write head (not shown) at predetermined times after the associated headers 32 pass under the head. Since the headers pass under the head at a constant rate, the system may find the start of a segment by first finding the appropriate header immediately preceding the segment and then waiting a predetermined time.

The segment waiting time will vary between bands and between different segments in the same band. For example, the waiting time associated with the segment 34B of band 1 is different from the waiting time associated with segment 34B of band 2. Similarly, the waiting time associated with segment 34B in band 1 is different from the waiting time associated with segment 34D in the same band. Once the system determines the waiting time for a given segment, it can easily find the start of that segment using a timer.

The timer, and thus the positioning of the read/write head over the segment, is independent of the frequency at which the data portions of the sectors are recorded. As discussed above, the inclusion of a combination of synchronization and sector address information in the single frequency headers enables the system to synchronize to the disk and determine the address of the sector then rotating under the head, without reading the data portion of the sector. The system can thus locate the appropriate sector and set the timer to locate the appropriate segment without reference to the frequency of the data sector.

Figure 6:
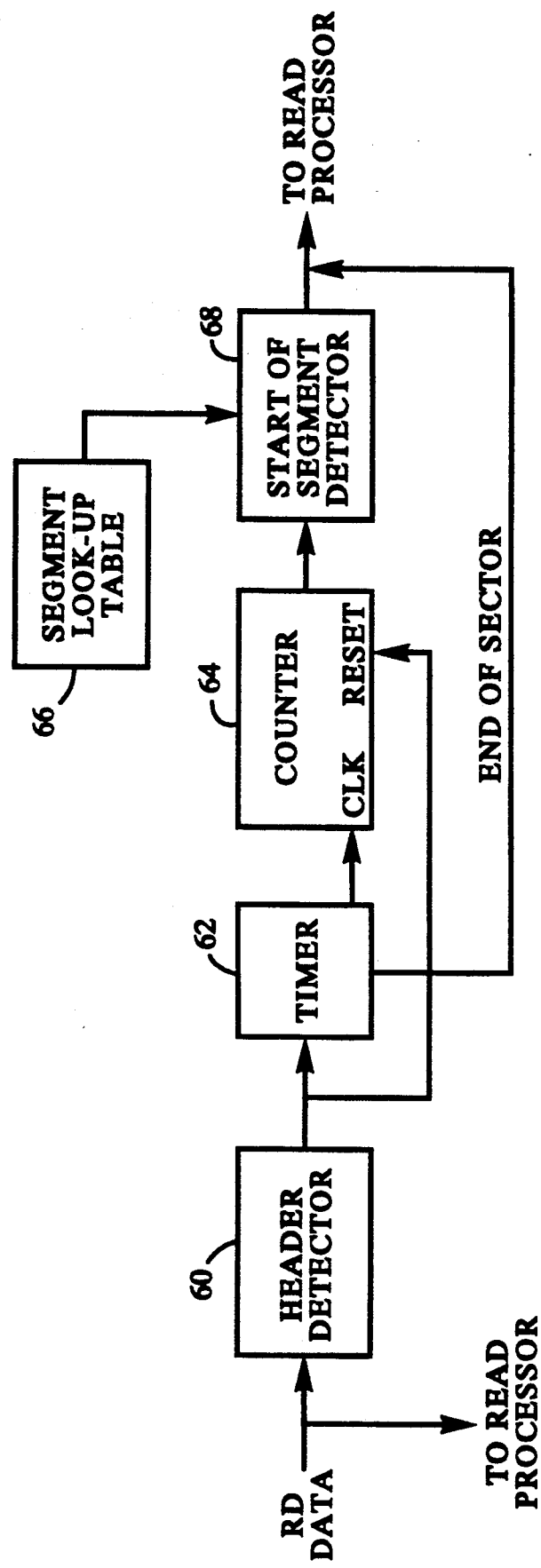
FIG. 6 is a functional block diagram of a system for determining a start of a block segment.

FIG. 6 shows a system for finding the start of the segments. A read/write head (not shown) retrieves recorded signals from and sends the signals to a header detector 60. The header detector 60 determines when a predetermined point in the header passes under the read/write head, and asserts a detect signal. The detect signal starts a timer 64 and a counter 62. The counter 62 counts the ticks of timer 64 and sends its count to a start-of-segment detector 68. A segment look-up table 66 provides to the start of segment detector 68 a count associated with the desired segment. When the count of counter 62 reaches the appropriate number, the start-of-segment detector 68 sends a start of segment signal to a read processor (not shown). When the timer expires, the head is over the end of the sector, and the timer notifies the read processor that the data segment has ended.

The read processor buffers the data retrieved from the disk in an appropriate buffer (not shown). The processor, for example, buffers segment 34B in band 2 as the start of a data block. It then buffers the retrieved data from segment 34C of the next sector as a continuation of the data block. When the full block is thus buffered, the read processor performs any necessary data error detection or correction procedures, using conventional techniques. When the read processor receives a start of segment signal it buffers any data thereafter retrieved as the start of a new data block.

The segment look-up table 66 contains a chart of timing counts for the segments. A system controller (not shown) sends to the table 66 a segment identifier which indicates whether a block begins or ends in the sector over which the head is then rotating. In response, table 66 provides an appropriate count to the start-of-segment detector 68. This count corresponds with the length of time it takes for the portion of the sector between the predetermined point of the header and the start of the segment data preamble to rotate under the head.

Figure 5B:
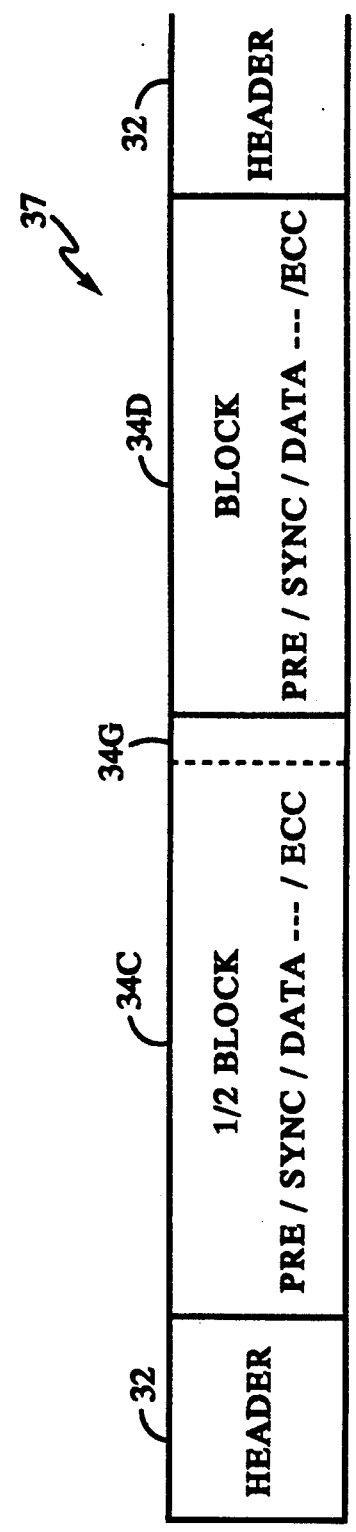

To compensate for slight variations in timer or counter operation or in the speed with which the disks rotate, that is, spindle speed variations, a gap 34G (FIG. 5) may be left between the segments in a sector and/or the data pattern of the data preamble character may be repeated to essentially lengthen the data preamble. This leaves room for a slight miss of the start of the data preamble. If, for example, the counter reaches its count late and the head has already passed over a portion of data preamble, the system can still synchronize to the recorded data using the portion of the data preamble which follows. If the counter reaches its count early, the head will be over the small gap 34G between segments and the system will not attempt to synchronize to the data until it senses the signal transitions of the data preamble.

A given sector may or may not contain a gap between segments. A sector will not contain a gap if, for example, the spindle is spinning the disks relatively slowly at the time the system performs a write operation in the second portion of the sector. The system starts the write operation at the expiration of a timer associated with the time it typically takes for the start of the segment to rotate under the head once a predetermined point in the header has passed the head. If the spindle is slow, the system begins its write operation at or relatively close to the end of the previous segment, which shrinks or eliminates any gap between the segments. Alternatively, if the spindle is spinning the disk relatively fast the system may leave a relatively large gap between the segments.

As described above with reference to FIG. 4, the data portions 34 of the sectors in the various bands are recorded at various band-related frequencies which correspond with the optimal signal densities for the lengths of sectors in the various bands. Thus in order for the system to, for example, read data from a sector, the system must synchronize to the appropriate data frequency in the time the data preamble and synchronization characters take to rotate under the head. Accordingly, the phase locked loop 16 (FIG. 1), which provides timing signals to the read processor, must provide in this time a data timing signal which establishes the appropriate bit, symbol, etc., boundaries for this data.

Figure 7:
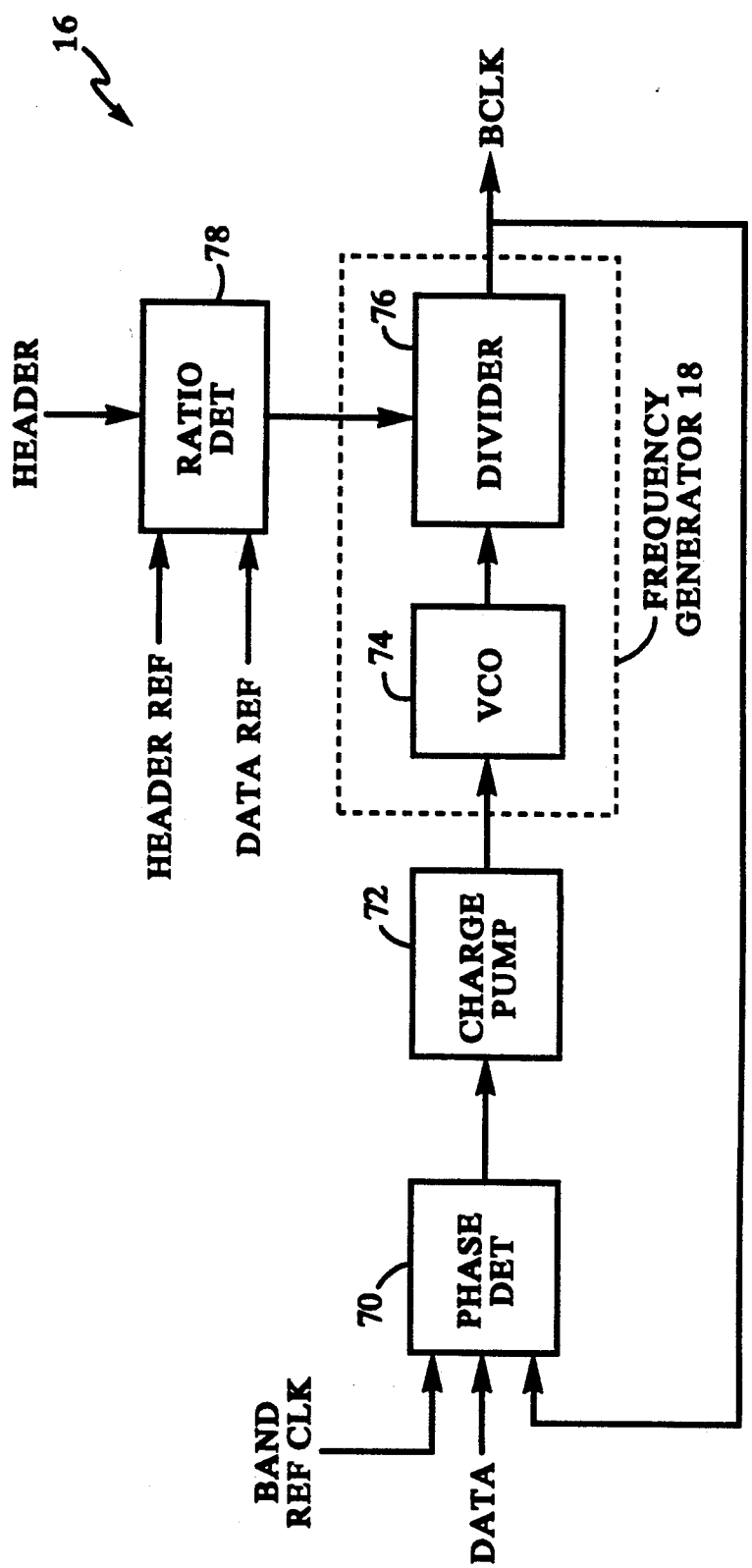
FIG. 7 is a functional block diagram of a phase locked loop shown in FIG. 1.

FIG. 7 shows, in more detail, phase locked loop 16 of FIG. 1. The phase locked loop includes a phase detector 70 which compares the phase of a generated bit-clock with signals read from the disk. The phase detector 70 then supplies a signal to charge pump 72 which directs the charge pump to supply to voltage controlled oscillator (VCO) 74 a control voltage which is higher, lower or the same as the control voltage previously supplied to the VCO.

The VCO 74 responds to the control voltage in a conventional manner by producing an output signal with a frequency which is directly related to the control voltage. A divider 76, with selectable divider ratios, receives the VCO output signal and supplies to a read processor (not shown) header or data timing signals, as appropriate, which are divided-down versions of the VCO output signal. The VCO 74 and the divider 76 operate together as frequency generator 18 (FIG. 1).

The divider 76 is controlled by a ratio processor 78. The ratio processor 78 essentially supplies to the divider 76 numbers by which to divide the frequency of the VCO output signal. The ratio processor 78 supplies different numbers, depending on whether the head is over a header or a data section of a sector. If the head is over a data section, the supplied number is based on the band in which the sector is located.

In the illustrative embodiment of the invention, the following ratios may be used for the bands:

| BAND | HEADER-TO-DATA |
| --- | --- |
| 3 | 12-to-6 |
| 2 | 12-to-8 |
| 1 | 12-to-9 |
| 0 | 12-to-12 | where the numbers correspond to the numbers by which the VCO output signal is divided for the headers and the data segments, respectively. For example, if the head is over a header in band 3, the header timing signal sent to the read processor is 1/12 the frequency of the VCO output signal. If the head is over a data section in the same band, the timing signal is 1/6 the frequency of the VCO output signal. The data timing signal is thus two times faster than the header timing signal and, if the header frequency is associated with a signal density which corresponds with the recording of one data block per sector, the band 3 data timing signal is associated with a signal density which corresponds with the recording of two data blocks per sector.

To simplify the divider circuitry and permit use of a slower VCO, small integer ratios of header frequency to data frequency may be used, such as:

| BAND | HEADER-TO-DATA |
| --- | --- |
| 3 | 4-to-2 |
| 2 | 3-to-2 |
| 1 | 4-to-3 |
| 0 | 4-to-4 |

When the head is moved to band 2, the VCO output signal changes to correspond to ⅓ the header frequency, instead of ¼ the header frequency used for the other bands. The system may include a reference clock with runs at a frequency which enables the phase detector and charge pump to drive the VCO, in the time between headers, to produce an output signal which is 3 times the header frequency. The VCO and divider can then supply to the read processor the appropriate header and data timing signals by switching the divider between dividing by 3 and by 2 at appropriate times.

Using this simplified circuitry, the system must acquire a new VCO frequency whenever it moves the read/write head from band 0,1 or 3 to band 2. When the system moves the head from band 2 to any other band it must again acquire a new VCO frequency. System timers associated with the headers and data segments remain the same, because the headers are in the same locations in this band as they are in any other band, and thus the system can easily locate desired sectors. The system can not, however, read and interpret the data segments until it stabilizes the VCO at the new frequency. The system thus trades time for circuit simplicity. Once the phase locked loop is synchronized to either band 2 or any of bands 0, 1 or 3, it can quickly switch from dividing by one small integer, either 3 or 4, to dividing by a second small integer, 2, 3, or 4, between headers and data sections. Accordingly, the simplified circuitry does not then slow down the system.

In another embodiment of the invention, separate read channels including, for example, separate phase locked loops, are used for the headers and the data sections of the sectors since the headers and data portions may be independently interpreted. The system synchronizes to the headers using the header read channel and then remains in synchronism with the headers for a series of read or write operations. When the system identifies a desired sector, it uses the data read or write channels tuned to the frequency of the data portions of the sectors in the associated band to retrieve or store the data signals.

Such a system does not require any particular relationship between the header frequency and the band-related frequencies of the data signals. Instead, circuitry designed specifically to operate at either the header frequency or the various data frequencies is used to synchronize the system to the recorded signals in the time it takes the appropriate preamble and synchronization characters to rotate under the head. Such systems may record any number of data segments per sector and use any number of bands.

The system basically does not require re-synchronization of the head when the head is moved between bands. Once the system is synchronized to the headers in one band, it is synchronized to the headers in all the bands because the headers are all recorded at the same frequency and they are radially aligned. Further, since the headers contain both synchronization and address information, the system can correctly identify a desired sector in any of the bands. The system can then set a timer for the start of a desired segment within the sector, regardless of the frequency of the data.

If the simplified phase locked loop circuitry described above is used, the system may require an adjustment of the VCO between specific bands. Once the system has adjusted and stabilized the VCO, however, it locates the desired segment using the timer and divides the VCO output signal by a band-related divider factor to bring the system into synchronism with the recorded data. The system can then read and interpret the data preamble and data synchronization character in real time to fine tune itself to the data.

The flexibility of the system enables it to format disks with an optimal header signal density determined, for example, by the error rates associated with various recording densities. The density of the header is selected to minimize bit-shift and inter-bit interference which may cause misinterpretation errors in the sector addresses. Variable amounts of data may then be recorded in the data portions of the sectors in any of a number of densities, based on the sizes of the sectors. The system can thus preserve the low address error rate required to interpret the sector addresses in the headers and record a maximum amount of data between the headers.

The foregoing description has been limited to specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A magnetic disk for recording signals representing binary data for storage and retrieval of information in conjunction with a read/write head, the disk having an inner edge and an outer edge and comprising:
   A. a plurality of concentric tracks, each of the tracks comprising a plurality of sectors with corresponding sectors being radially aligned;
   B. each of the sectors comprising a header and a data section, the header in each of the sectors being recorded at a header frequency;
   C. a plurality of concentric bands, each of the bands comprising a plurality of tracks and each of the data sections of the sectors in the tracks in a band being recorded at a band-related frequency.

2. The magnetic disk of claim 1, wherein each of said bands is associated with a different band-related frequency and said bands closer to the outer edge of the disk are associated with a higher frequency than the bands closer to the inner edge of the disk.

3. The magnetic disk of claim 2, wherein each of said headers contains embedded servo information.

4. A magnetic disk system comprising:
   A. a plurality of magnetic disks on a common spindle for recording signals representing binary data, each of said disks comprising:
      1. a plurality of concentric tracks, each of said tracks comprising a plurality of sectors with corresponding sectors being radially aligned;
      2. each of said sectors comprising a header and a data section, said header in each of said sectors being recorded at a header frequency;
      3. a plurality of concentric bands, each of said bands comprising a plurality of tracks and each of the data sections of the sectors in the tracks in a band being recorded at a band-related frequency;
   B. read/write head for retrieving signals from or storing signals on said disks, said read/write head retrieving signals from or writing signals to a sector as the sector rotates under it;
   C. reference means for establishing a reference signal which has a frequency which is proportional to the header frequency;
   D. timing means for receiving the reference signal and producing a header timing signal and a data timing signal by dividing the frequency of the reference signal by factors associated, respectively, with the header frequency and with the data frequency associated with the band over which the read/write head is then positioned, the timing means producing the header timing signal when the read/write head is over a header and the data timing signal when the read/write head is over a data section;
   E. processor means for receiving from the read/write head signals retrieved from the disk or supplying to the read/write head signals to be stored on the disk and receiving from the timing means header and data timing signals, the processor means in response to the received signals
      1. decoding the data signals retrieved from the disk using the header and timing signals to produce binary data symbols, or
      2. encoding binary data symbols to produce the data signals for supplying to the read/write head for recording, the processor means and the read/write head operating together to (i) locate a designated sector by interpreting the header information in accordance with the header timing signal and (ii) store the data signal on the disk in the designated sector in accordance with the data timing signal.

5. The system of claim 4, wherein the data portions of the sectors are recorded at frequencies which are related to the header frequency by a ratio of integers.

6. The system of claim 5, wherein said timing means comprises:
   a. a voltage controlled oscillator for producing a reference signal,
   b. a phase detector for detecting a phase difference between the reference signal and the data signal and producing an error signal corresponding to the difference,
   c. a charge pump for receiving the error signal from the phase detector and supplying to the voltage controlled oscillator a control voltage which directs the voltage controlled oscillator to produce an output signal which is closer in phase to the data signal, and
   d. a divider for dividing the frequency of the reference signal by the factors.

7. The system of claim 6, wherein said factors used by said timing means correspond to the relationship between the header frequency and the data frequency of the band over which the read/write head is then positioned.

8. A magnetic disk system comprising:
   A. magnetic disk for recording signals representing binary data, said disk comprising:
      1. a plurality of concentric tracks, each of said tracks comprising a plurality of sectors with corresponding sectors being radially aligned;
      2. each of said sectors comprising a header and a data section, said header in each of said sectors being recorded at a header frequency;
      3. a plurality of concentric bands, each of said bands comprising a plurality of tracks and each of the data sections of the sectors in the tracks in a band being recorded at a band-related frequency;
   B. a read/write head for retrieving signals from or storing signals on said disks, said read/write head retrieving signals from or writing signals to a sector as the sector rotates under it;
   C. reference means for establishing a reference signal which has a frequency which is proportional to the header frequency;
   D. timing means for receiving the reference signal and producing a header timing signal and a data timing signal by dividing the frequency of the reference signal by factors associated, respectively, with the header frequency and with the data frequency associated with the band over which the read/write head is then positioned, the timing means producing the header timing signal when the read/write head is over a header and the data timing signal when the read/write head is over a data section;

E. processor means for receiving from the read/write head signals retrieved from the disk or supplying to the read/write head signals to be stored on the disk and receiving from the timing means header and data timing signals, the processor means in response to the received signals
1. decoding the data signals retrieved from the disk using the header and timing signals to produce binary data symbols, or
2. encoding binary data symbols to produce the data signals for supplying to the read/write head for recording, the processor means and the read/write head operating together to (i) locate a designated sector by interpreting the header information in accordance with the header timing signal and (ii) store the data signal on the disk in the designated sector in accordance with the data timing signal.

9. The system of claim 8, wherein the data portions of the sectors are recorded at frequencies which are related to the header frequency by a ratio of integers.

10. The system of claim 9, wherein said timing means comprises:
a. a voltage controlled oscillator for producing a reference signal,
b. a phase detector for detecting a phase difference between the reference signal and the data signal and producing an error signal corresponding to the difference,
c. a charge pump for receiving the error signal from the phase detector and supplying to the voltage controlled oscillator a control voltage which directs the voltage controlled oscillator to produce an output signal which is closer in phase to the data signal, and
d. a divider for dividing the frequency of the reference signal by the factors.

11. The system of claim 10, wherein said factors used by said timing means correspond to the relationship between the header frequency and the data frequency of the band over which the read/write head is then positioned.

12. A system for retrieving data from magnetic storage disks recorded in a banded format, said disks being recorded in sectors, with each sector including a header and a data section, and the data section being recorded in a frequency that is proportional to the frequency of the signals recorded in the header, said system comprising:
A. read heads each associated with a surface of or a portion of a surface of the magnetic disks for retrieving signals from the disks;
B. a phase locked loop for producing timing signals associated with the signals, said phase locked loop comprising
1. a voltage controlled oscillator for producing a reference signal,
2. a phase detector for detecting a phase difference between the reference signal and the signals retrieved from the disk, the phase detector producing an error signal corresponding to the phase difference,
3. a charge pump for receiving the error signal from the phase detector and supplying to the voltage controlled oscillator a control voltage which directs the voltage controlled oscillator to produce an output signal which is closer in phase to the data signal, and 4. a divider for dividing the frequency of the reference signal to produce timing signals, said divider dividing-down the reference signal by factors related to:
(i) the portion of the sector over which the head is located, said divider producing header timing signals which do not vary according to the band over which the head is located, when the head is over the header section, and
(ii) if the head is over a data section, said divider producing data timing signals related to the band over which the head is located; and
c. decoding means for receiving the header timing signals and the data timing signals and demodulating the signals retrieved from the disk, the decoding means producing for the signals retrieved from the data portions of the disk corresponding binary data symbols.

13. A system for retrieving signals from a magnetic disk recorded in a banded format with radially aligned sectors having headers recorded in a header frequency and variable amounts of data arranged in fixed-size data blocks and segments of data blocks recorded in band-related frequencies, the system comprising:
A. a read head for retrieving signals from the disk;
B. a header detector for detecting when a header is rotating under the read head and asserting a signal when a predetermined point in the header passes under the head, the header detector detecting the headers when the system is not synchronized to the headers;
C. header timing means, using header timing signals produced after the system synchronizes to the headers, for determining when a header is rotating under the read head and asserting a signal when a predetermined point in the header passes under the head;
D. timing means for receiving the signal produced by the header detector or the header timing means and starting a timer;
E. a look-up table for storing for each sector a value which corresponds with the time it takes to rotate the start of a data block or a data segment under the head;
F. a start of segment detector for acquiring (i) from the look-up table a value associated with a segment in the sector then rotating under the read head and (ii) from the time the time, the start of segment detector asserting a start of segment signal when the timer reaches the value received from the look-up table; and
G. buffer means for buffering data retrieved from the disk as data blocks, the buffer means in response to the start of segment signal from the start of segment detector buffering retrieved data as a new data block.

14. A system for retrieving signals from magnetic disks recorded in a banded format with radially aligned sectors having headers recorded in a header frequency and variable amounts of data arranged in fixed-size data blocks and segments of data blocks recorded in band-related frequencies, the system comprising:
A. a plurality of read heads for retrieving signals from the disks, each read head being associated with a surface on one of the magnetic disks;
B. a header detector for detecting when a header is rotating under a selected read head and asserting a signal when a predetermined point in the header passes under the head, the header detector detecting the headers when the system is not synchronized to the headers;

C. header timing means, using header timing signals produced after the system synchronizes to the headers, for determining when a header is rotating under a selected read head and asserting a signal when a predetermined point in the header passes under the head;

D. timing means for receiving the signal produced by the header detector or the header timing means and starting a timer;

E. a look-up table for storing for each sector a value which corresponds with the time it takes to rotate the start of a data block or a data segment under the head;

F. a start of segment detector for acquiring (i) from the look-up table a value associated with a segment in the sector then rotating under the read head and (ii) from the timer the time, the start of segment detector asserting a start of segment signal when the timer reaches the value received from the look-up table; and G. buffer means for buffering data retrieved from the disk as data blocks, the buffer means in response to the start of segment signal from the start of segment detector buffering the data as a new data block.

15. A system for retrieving signals from or recording signals on magnetic disks arranged in a banded format with radially aligned sectors and each sector having headers recorded in a header frequency and variable amounts of data arranged in fixed-size data blocks and segments of data blocks recorded in band-related frequencies, the system comprising:

A. a read/write head;

B. a header read channel tuned to the frequency of the headers;

C. a data read write channel which includes a phase locked loop having a divider with selectable divider ratios corresponding to the band-related frequencies; and D. a system controller which selects for interpreting the signals read from the disk the header read channel when the read/write head is over a sector header and the data read write channel when the read/write head is over the data portion of the sector, the controller selecting for the data read channel the divider ratio corresponding to the band in which the sector is located.

* * * * *